(12) United States Patent
Johansson

(10) Patent No.: US 9,086,799 B2
(45) Date of Patent: Jul. 21, 2015

(54) METHOD FOR APPLICATION LAUNCH AND SYSTEM FUNCTION

(75) Inventor: Karl-Anders Johansson, Staffanstorp (SE)

(73) Assignee: BlackBerry Limited, Waterloo, Ontario (CA)

( * ) Notice: Subject to any disclaimer, the term of this patent is extended or adjusted under 35 U.S.C. 154(b) by 593 days.

(21) Appl. No.: 13/122,849

(22) PCT Filed: Sep. 30, 2009

(86) PCT No.: PCT/EP2009/062682
§ 371 (c)(1),
(2), (4) Date: Sep. 15, 2011

(87) PCT Pub. No.: WO2010/040670
PCT Pub. Date: Apr. 15, 2010

(65) Prior Publication Data
US 2011/0316797 A1    Dec. 29, 2011

Related U.S. Application Data

(60) Provisional application No. 61/102,892, filed on Oct. 6, 2008.

(51) Int. Cl.
G06F 3/044    (2006.01)
G06F 3/0488    (2013.01)

(52) U.S. Cl.
CPC .................................. *G06F 3/04883* (2013.01)

(58) Field of Classification Search
CPC .............................. G06F 3/041; G06F 3/04883
USPC .......................................................... 345/173
See application file for complete search history.

(56) References Cited

U.S. PATENT DOCUMENTS

| | | | |
|---|---|---|---|
| 5,805,167 A * | 9/1998 | van Cruyningen | 715/808 |
| 2001/0011979 A1* | 8/2001 | Hasegawa et al. | 345/87 |
| 2006/0092177 A1* | 5/2006 | Blasko | 345/619 |
| 2007/0150842 A1* | 6/2007 | Chaudhri et al. | 715/863 |
| 2008/0174570 A1* | 7/2008 | Jobs et al. | 345/173 |

OTHER PUBLICATIONS

International Search report and the Written Opinion mailed Feb. 28, 2011, in corresponding PCT patent application No. PCT/EP2009/062682.
International Preliminary report on Patentability and the Written Opinion mailed Apr. 12, 2011, in corresponding PCT patent application No. PCT/EP2009/062682.
"T-Mobile. G1 User Guide", Sep. 12, 2008; p. 143PP, XP007917079; retrieved from http://issuu.com/dhpss/docs/tm30234 [retrieved on Feb. 9, 2011] pp. 1, 15, 17, 18.
Office Action mailed Aug. 14, 2014; in Canadian patent application No. 2,739,760.

* cited by examiner

*Primary Examiner* — Towfiq Elahi
(74) *Attorney, Agent, or Firm* — Fish & Richardson P.C.

(57) ABSTRACT

The system comprises the ability to detect certain gestures made by sliding a finger or stylus on a touch sensitive screen on a handheld device, even when a so called "screen lock" is active where the gesture is used to unlock the device and trigger the desired function associates with the gesture.

15 Claims, 21 Drawing Sheets

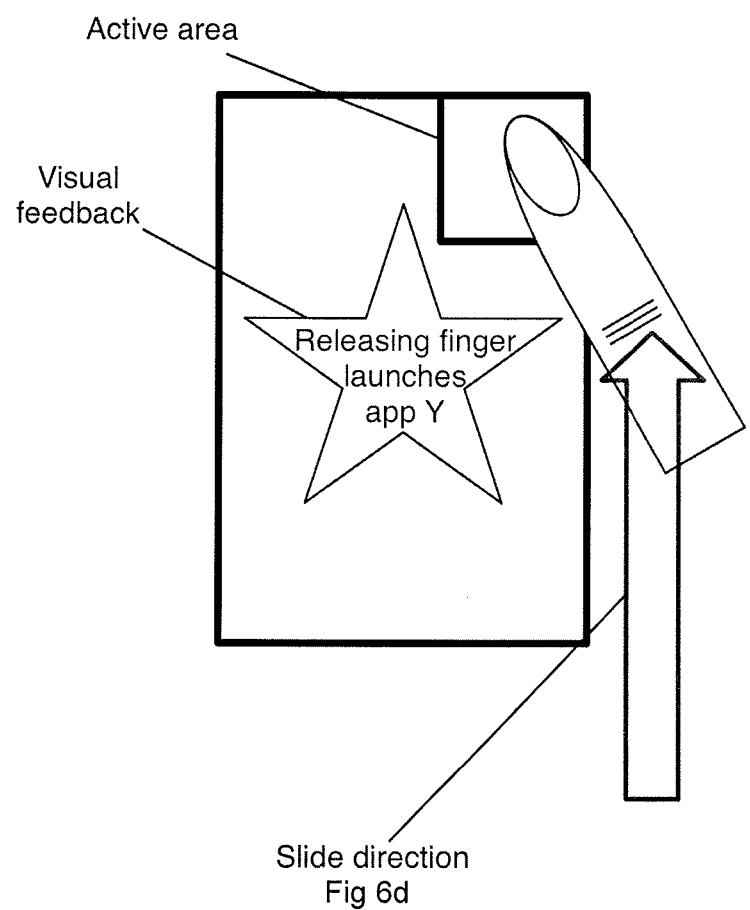

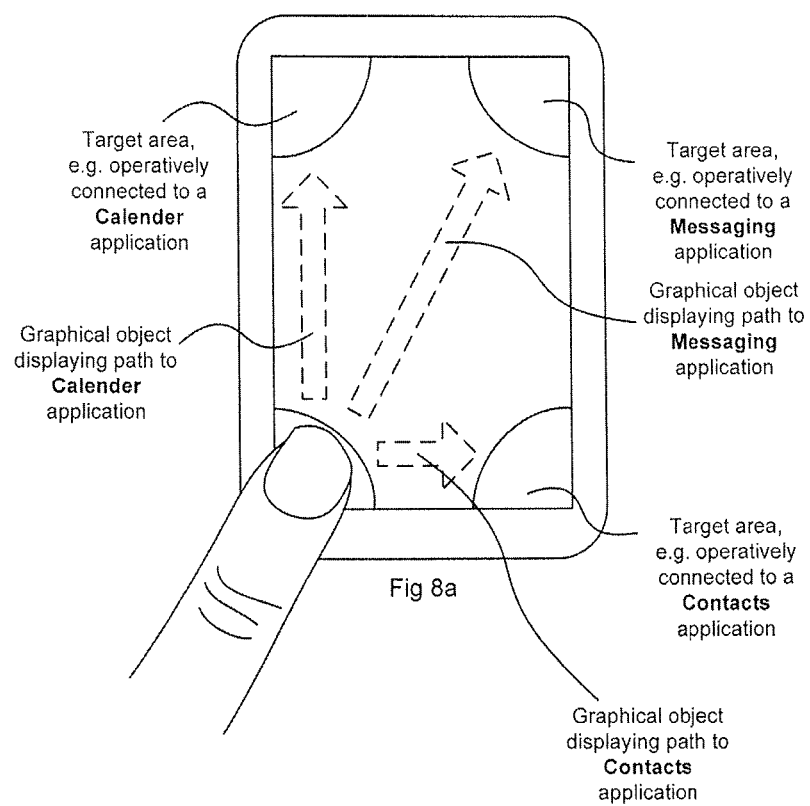

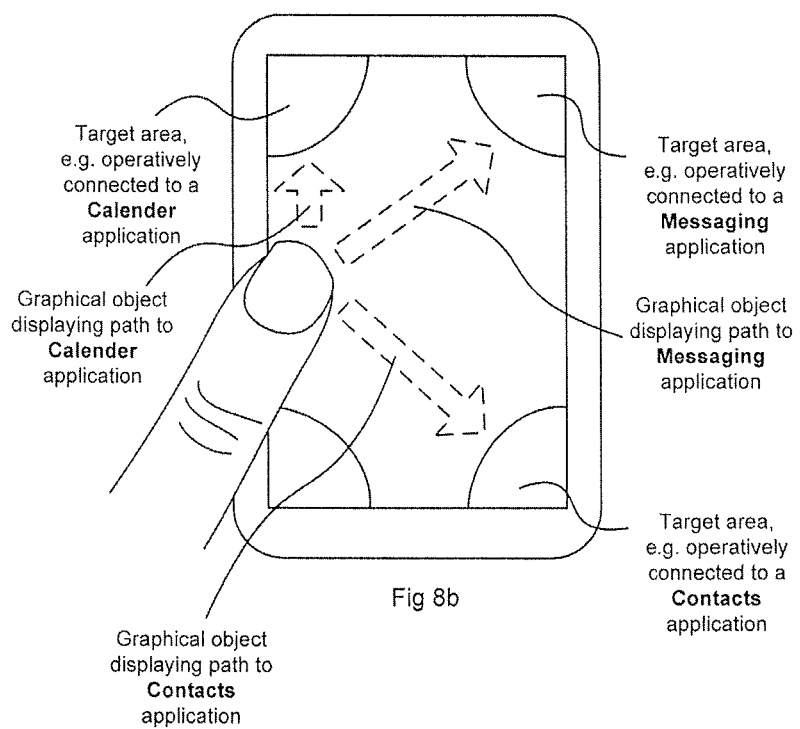

METHOD FOR APPLICATION LAUNCH AND SYSTEM FUNCTION

BACKGROUND

This invention combines two previously unrelated areas, namely screen-and keyboard unlocking mechanisms and application launch systems, which are here described separately.

Traditionally and typically, screen- and keyboard unlocking mechanisms on mobile/handheld devices involve multiple key presses or a combination of key presses and touch screen gestures to prevent spurious unlocks that would occur if only one action was necessary. Note that several devices on the market today actually a single key press on a special key to unlock the device (e.g. a Camera button). This special key can easily be pressed by mistake when the device is placed in a pocket or a bag.

These systems all suffer from the fact that extra actions are needed to start using the device and access the functionality and/or applications on the device if the user already knows what she wants to access.

Application launch and access to certain system functions sometimes need to be very quick. Typical ways of starting applications on a mobile/handheld device involve navigating a menu system. The number of key presses or gestures vary immensely from device to device and from manufacturer to manufacturer, and in some cases the devices even have dedicated hardware buttons that trigger the start of certain applications. Note that the latter tend to suffer from the spurious device unlocks described in the paragraph above. The fewest number of actions needed to start an application after the device has been safely unlocked is however in the best case 1 (one), and that is in the case of having a direct shortcut to the application from the screen that is shown after the device is unlocked.

Many application launch systems—especially those running on devices with only touch sensitive screens as main input—require the user to look on the screen when navigating the menu structure or using the direct shortcuts available. Even worse is the situation on devices where layout is dynamic and a certain application launch command is located on different positions on different occasions.

BRIEF LIST OF FIGURES

Figure 1:
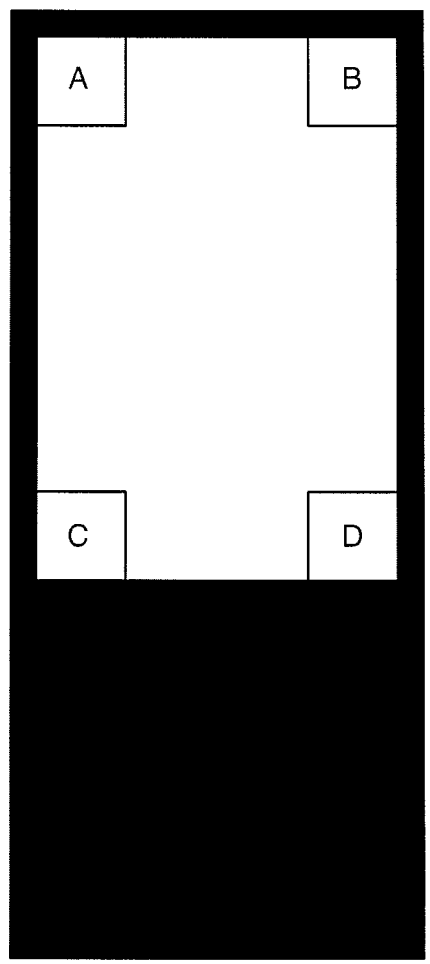

FIG. 1. One possible embodiment of invention; a device with touch sensitive screen with four activation areas.

Figure 2:
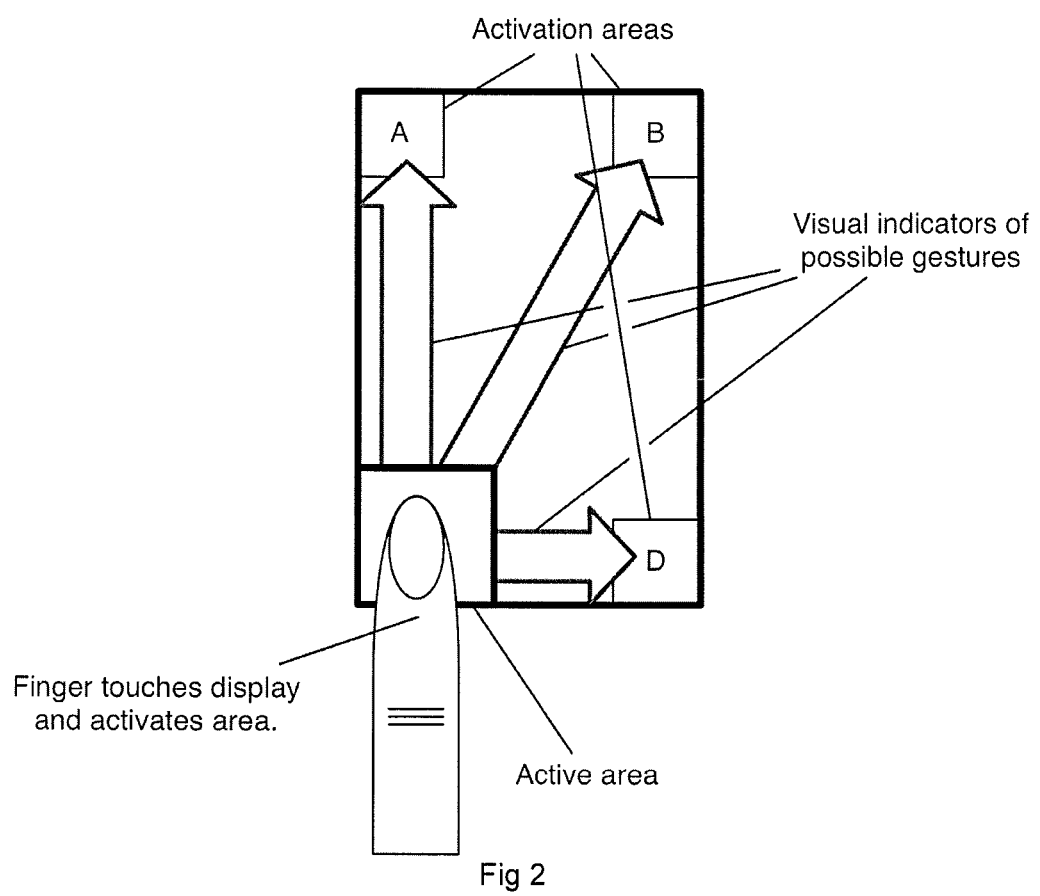

FIG. 2. When touching an activation area, the available choices are shown in the other activation areas.

Figure 3:
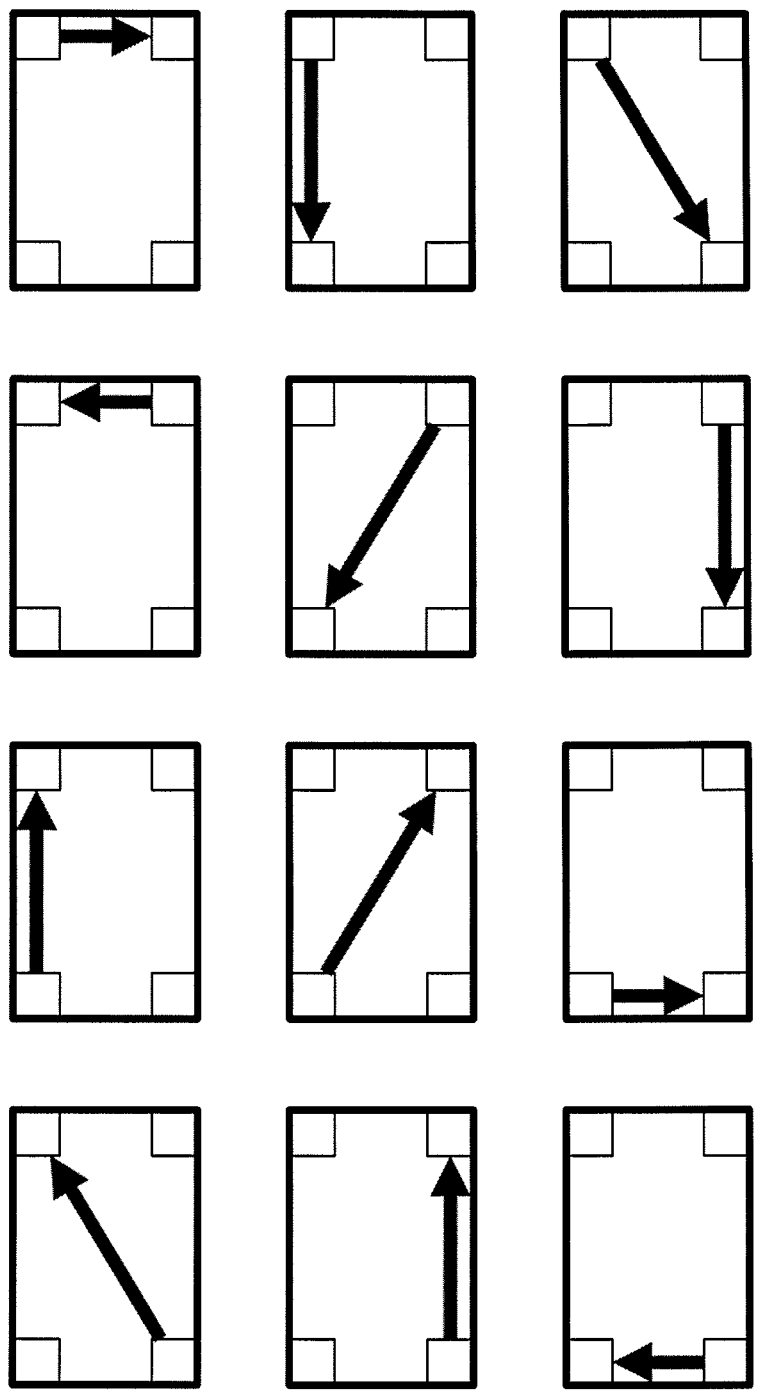
Figure 4A:
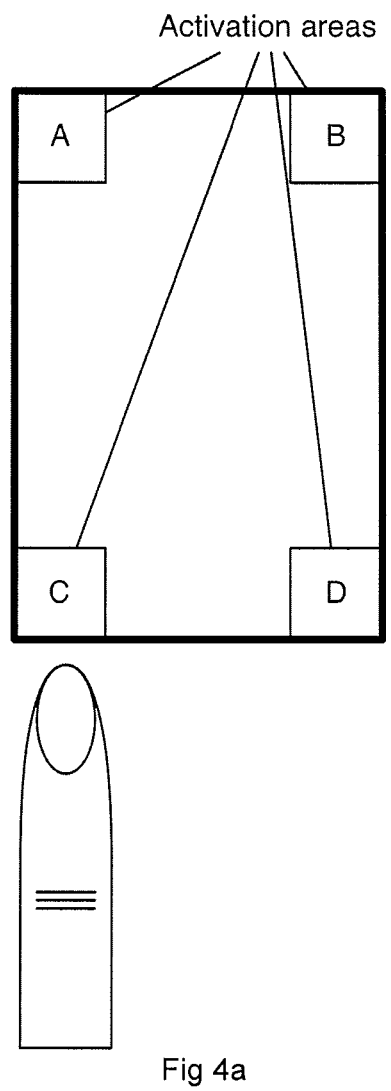
Figure 4B:
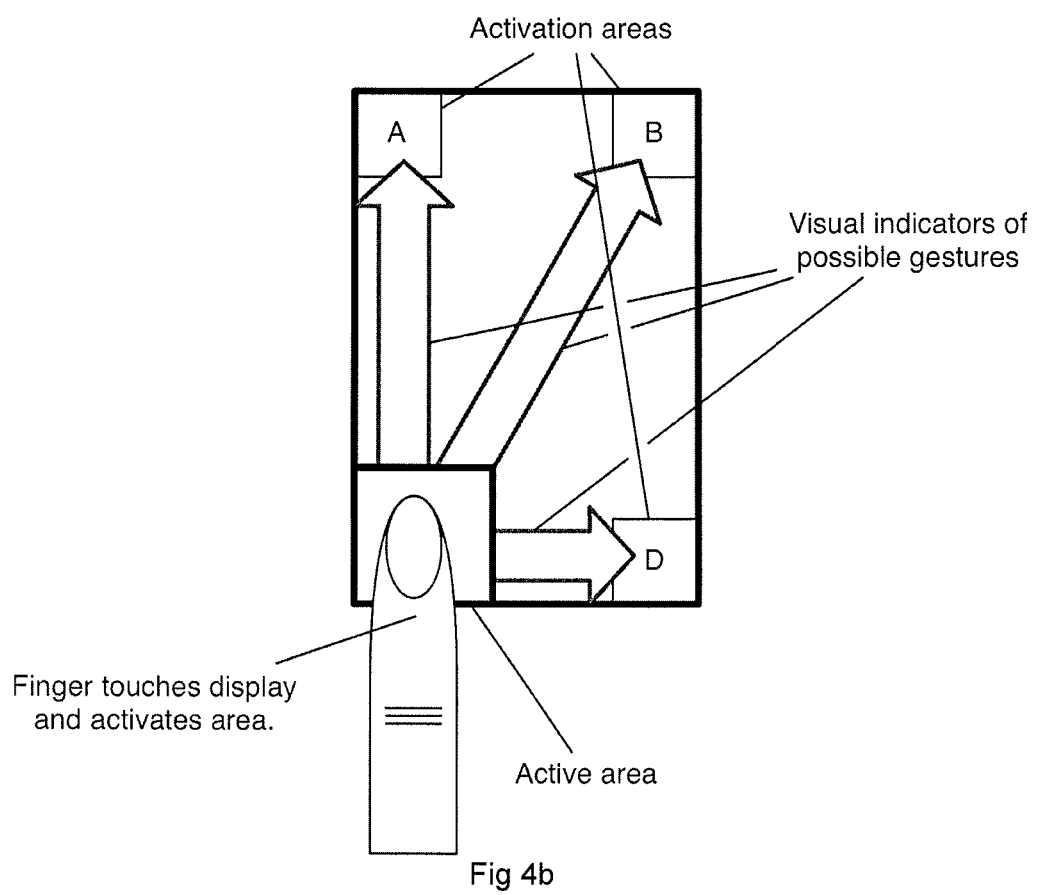
Figure 4C:
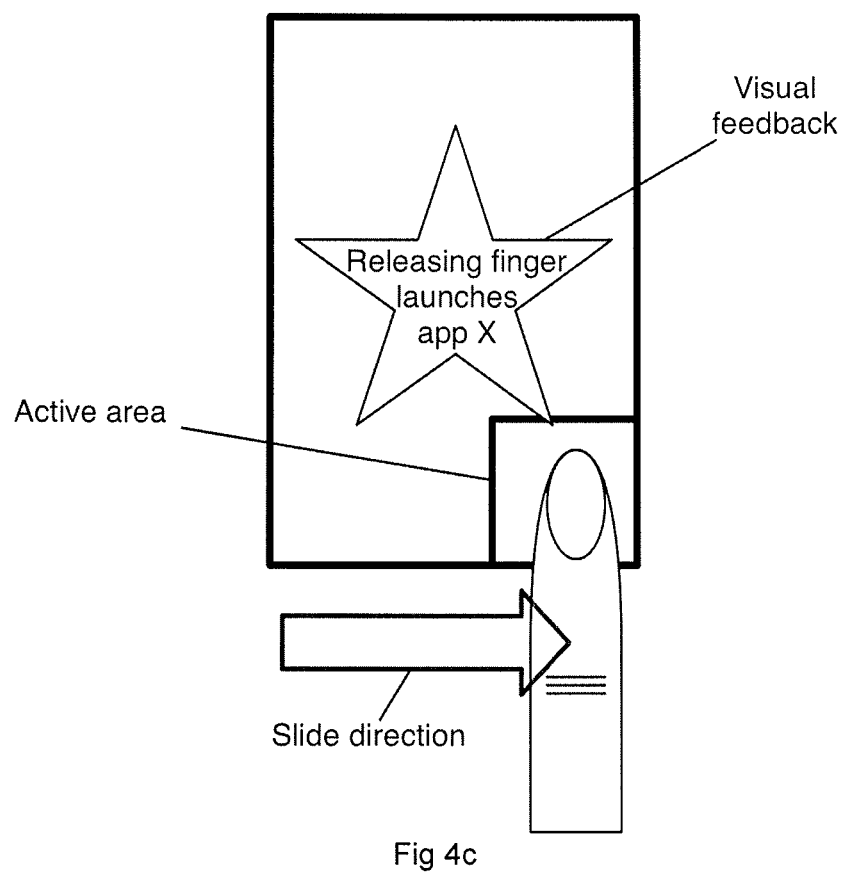
Figure 4D:
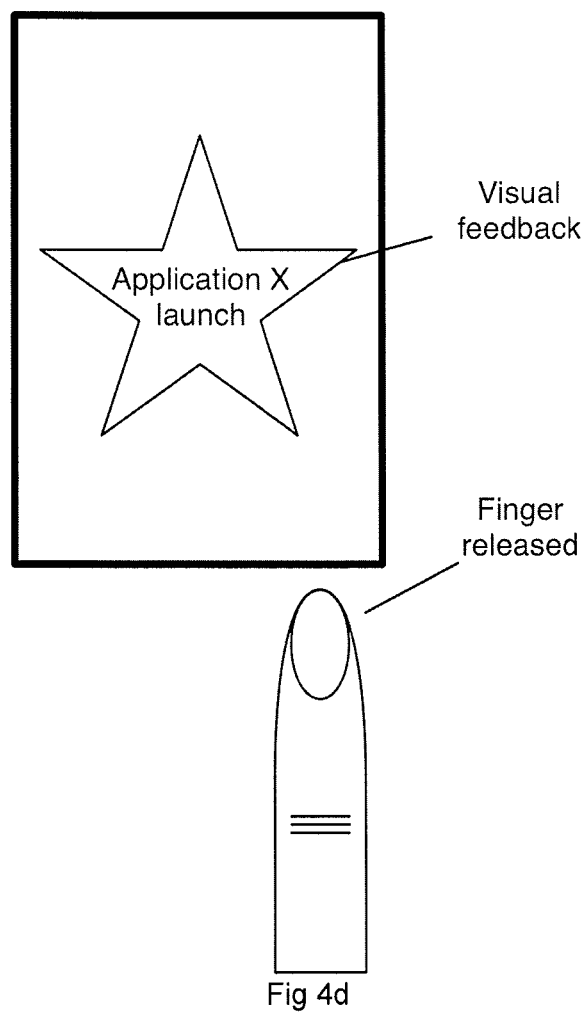

FIG. 3. All possible single slide gestures available when the four corners are used as activation areas.

FIG. 4*a-d*. Demonstrating a single slide gesture from activation zone C to D FIG. 5. All possible two-slide gestures available when the four corners are used as activation zones.

FIG. 6.*a-e* Demonstrating a multi slide gesture from C to D to B

FIG. 7*a-d*. Demonstrating unlocking the device and launching an application using a single slide gesture from activation zone C to D.

FIG. 8*a-d*. Demonstrating a single slide gesture by example of launching the Calendar application.

DETAILED DESCRIPTION OF THE INVENTION

The present invention combines the two previously unrelated areas of screen- and keyboard unlocking mechanisms and application launch systems. Further, the invention utilizes the physically distinguishable areas, such as corners of the screen, which is advantageous since these are easy to recognize by a user without looking at the screen. By utilizing the physically distinguishable areas it is possible for a user to rely on muscle memory which is positive from a user experience perspective. Therefore, the problem that there is little or no possibility to "feel" where virtual buttons and selection areas are represented is solved.

Starting with application launch, the intention is to bring the simplicity and ease-of-use of non-touch screen devices to touch screen devices. As described in the "background" section, touch screen devices typically suffer from not encouraging or allowing the user to learn how to start applications and access system functions using muscle memory.

The invention introduces a set of restricted gestures that allow the user to perform them without looking at the screen. This is achieved by designing gestures that start, go through and end at certain activation areas on the screen that are easy to feel with the fingers. Throughout the text and figures of this document we use the four corners of the touch sensitive screen as activation areas for simplicity and clarity since these are especially easy to feel with the finger, but the technique is easily extendable to more or other areas if the physical embodiment of the device encourage other areas of the screens to be used instead of or in addition to the corners.

Note that applications and system functions are activated through slides between different activation areas and not by simply touching/pressing the activation areas.

The simplest form of slide gesture is the Single Slide Gesture, which goes from one activation area to another. All possible Single Slide Gestures using four activation areas are shown in FIG. 3. There are 12 possible Single Slide Gestures using four corners.

FIG. 4 illustrates the use case of launching an application using a single slide gesture. In FIG. 4*a* the graphical representations of the activation areas prompt the user to touch one activation area. FIG. 4*b* illustrate that when one of them is touched there is a visual prompt to slide the finger to another activation area. FIG. 4*c* illustrate when the finger has reached the destination activation area where visual feedback is given informing the user that by releasing the finger, the application will be launched [or system function invoked]. And finally in FIG. 4*d*, the finger is released and visual feedback is given in the form of the launching application [or equivalent].

Figure 5:
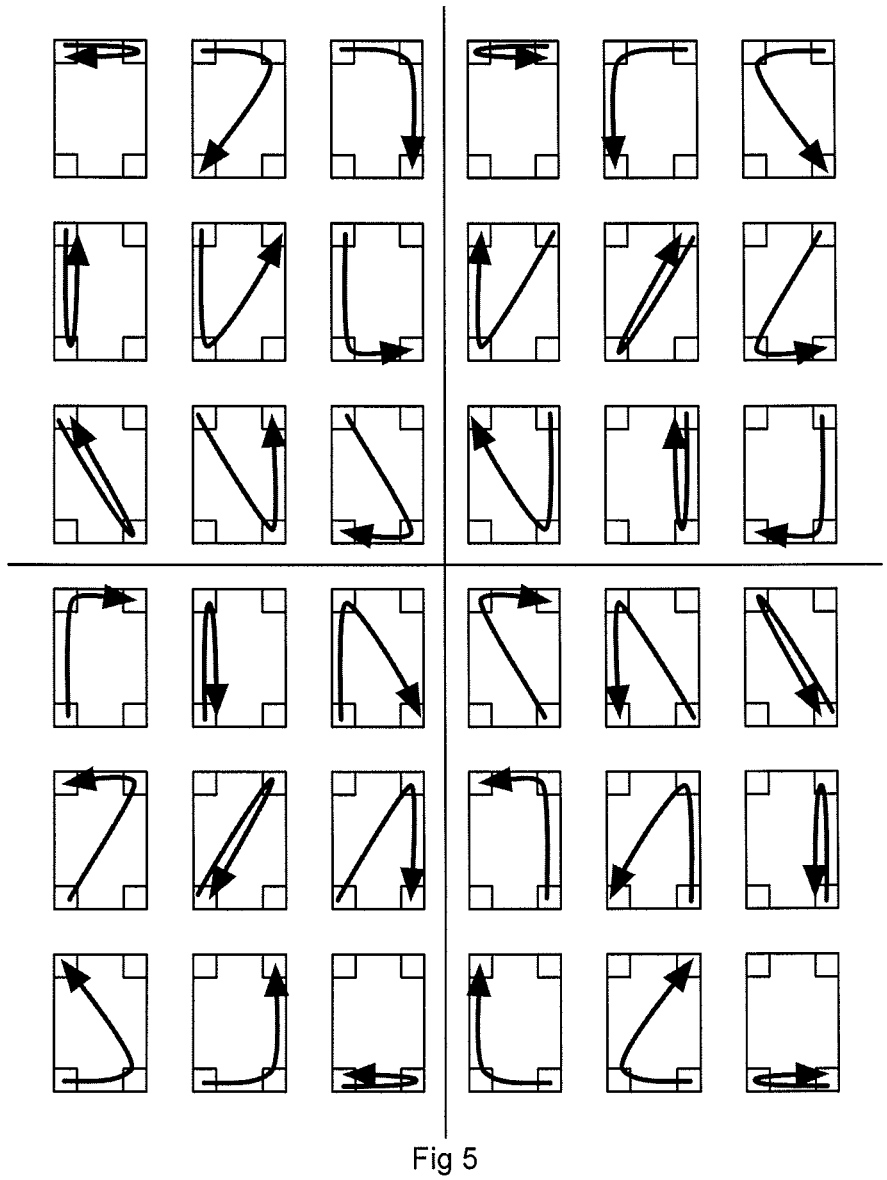
Figure 6A:
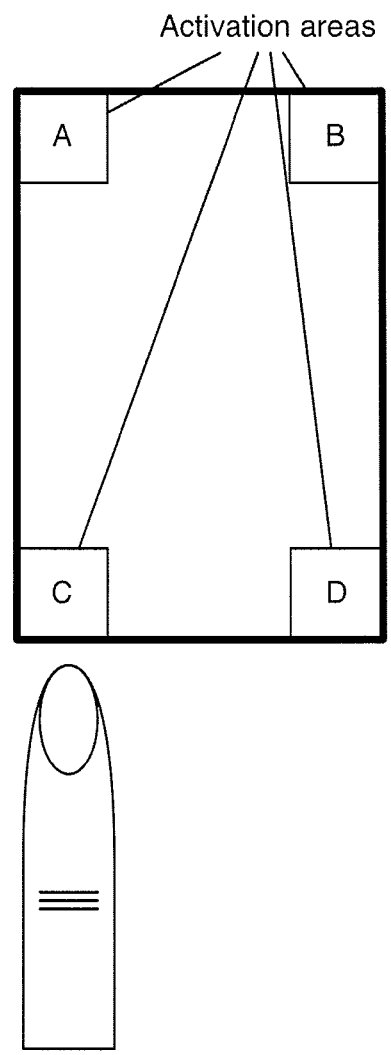
Figure 6B:
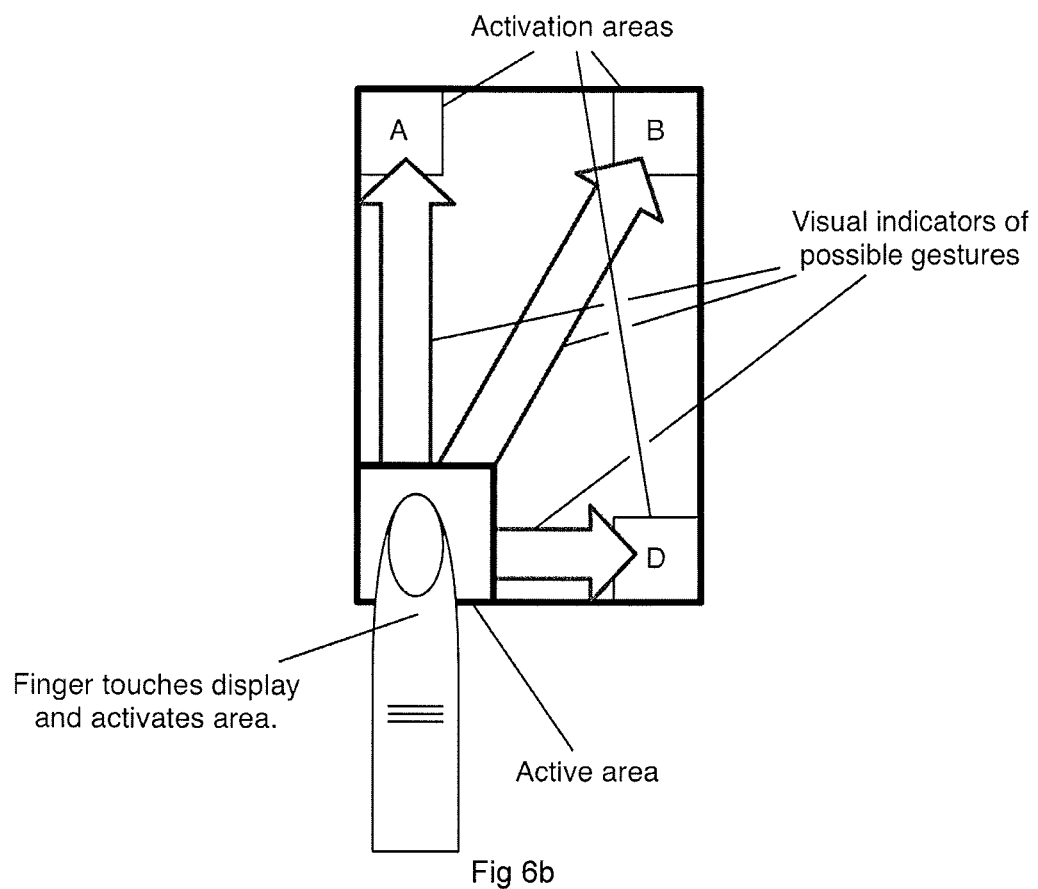
Figure 6C:
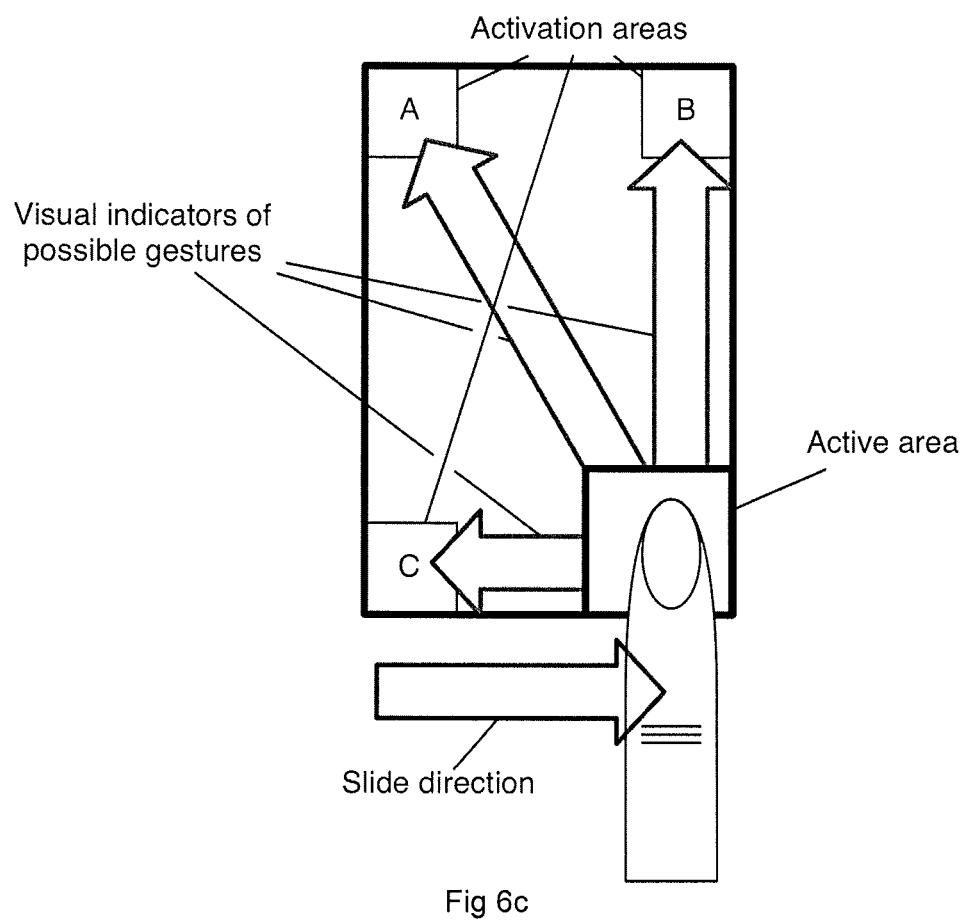
Figure 6E:
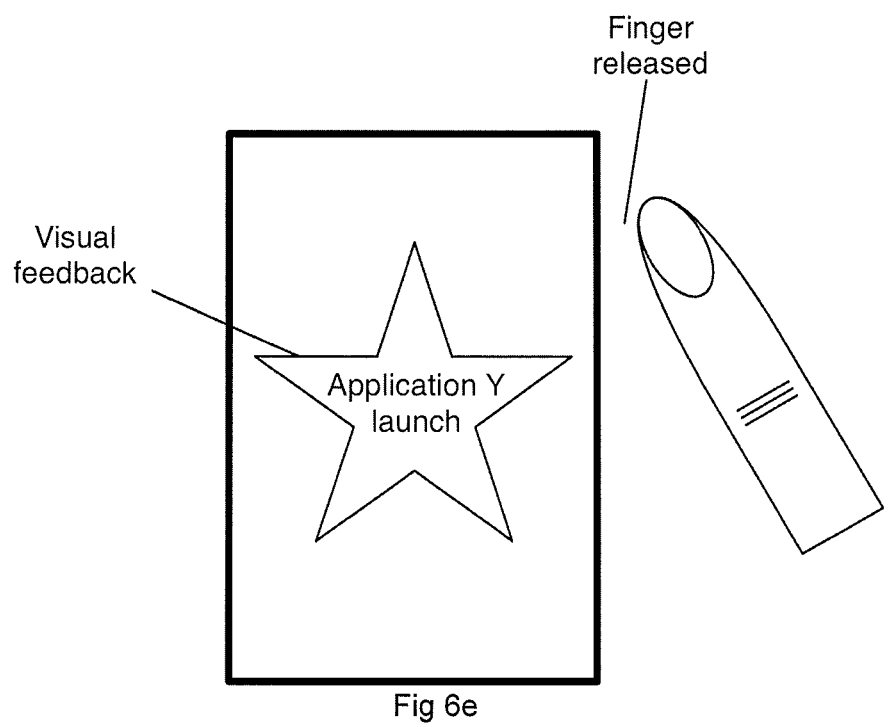
Figure 7A:
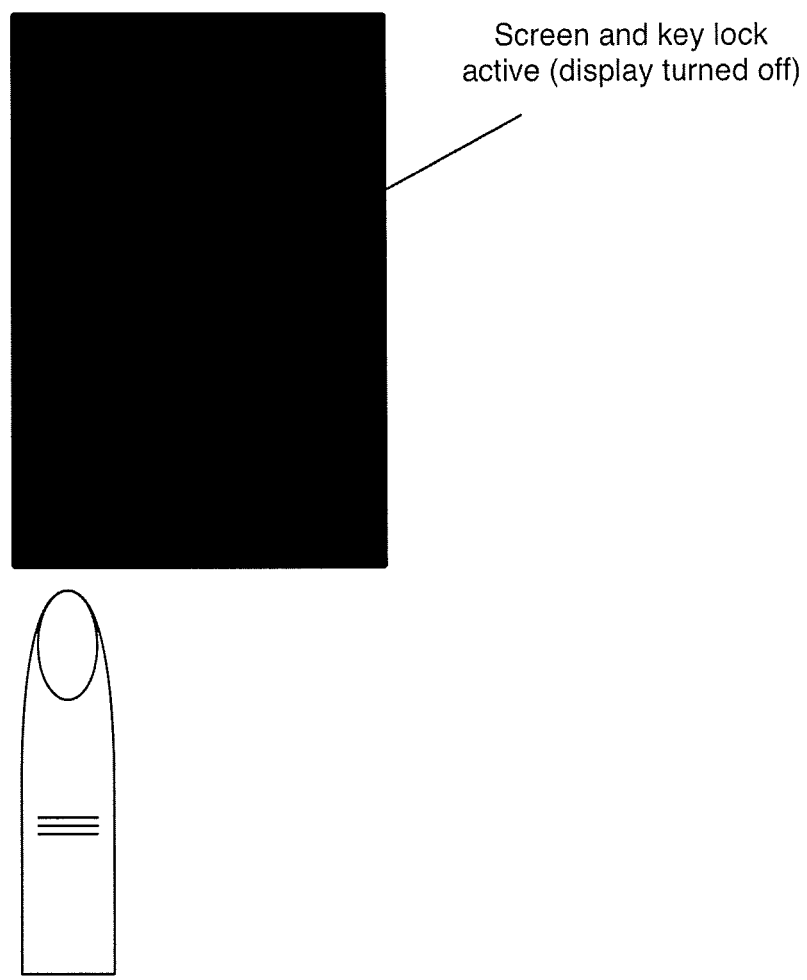
Figure 7B:
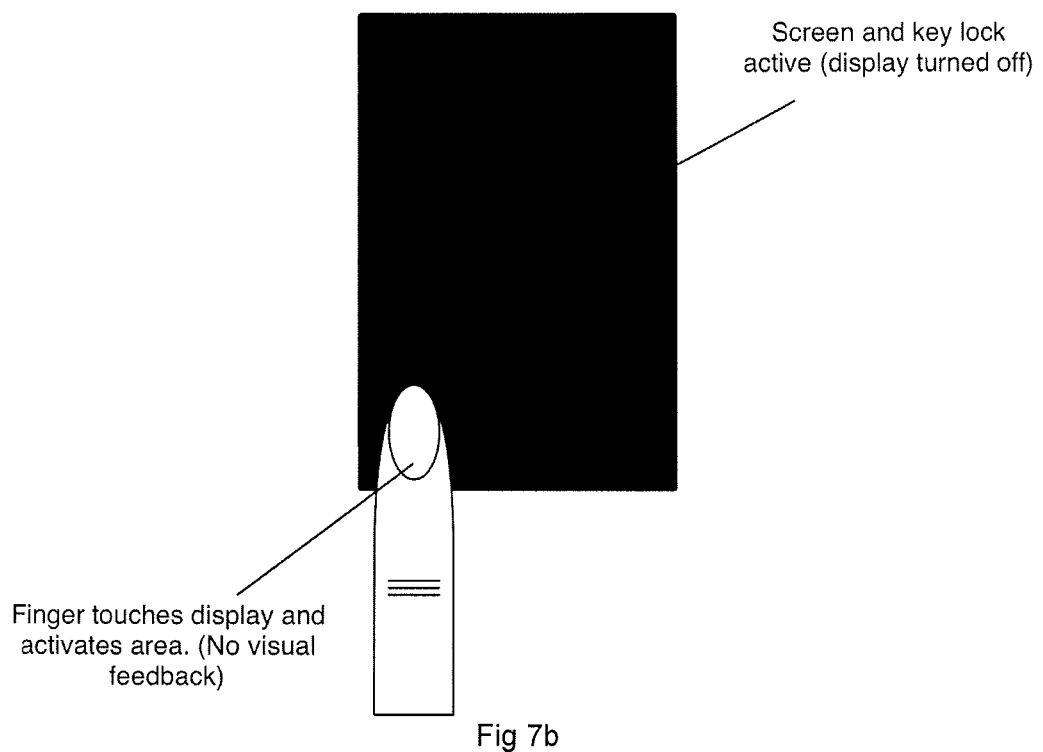
Figure 7C:
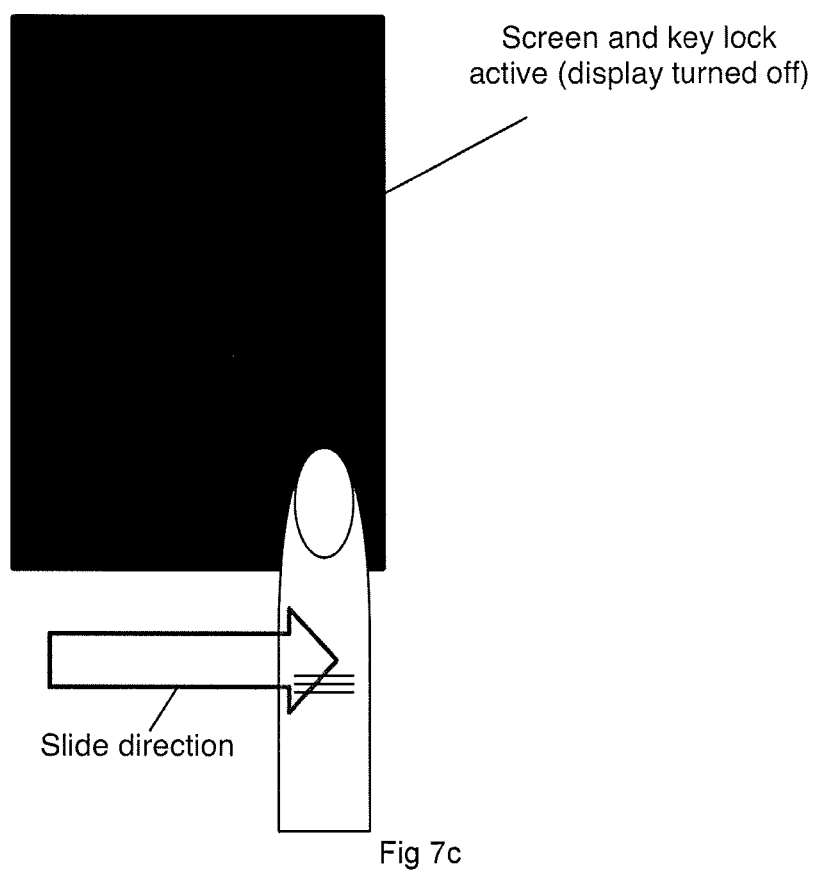
Figure 7D:
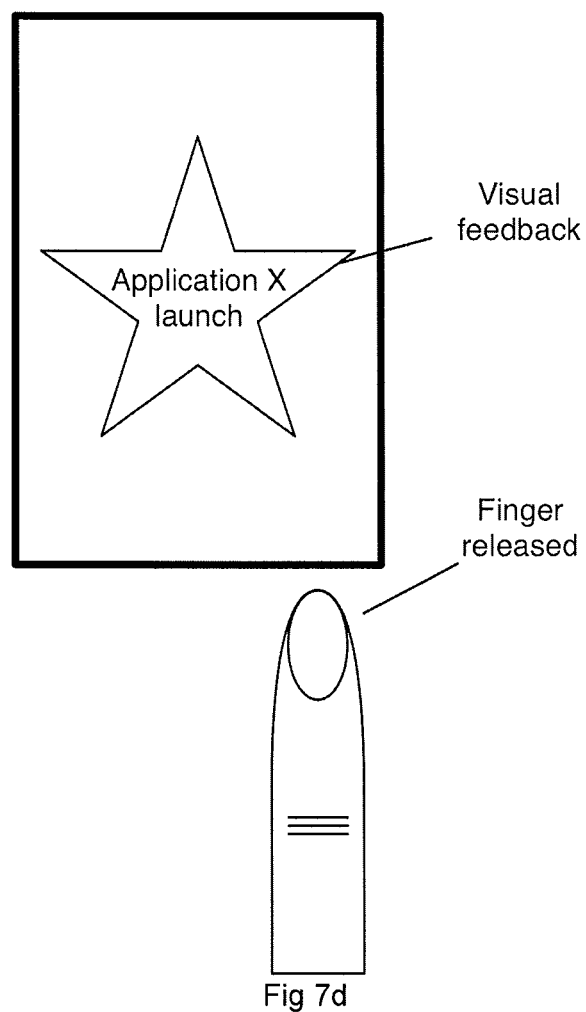

The Multi Slide Gesture is a gesture where more slides are used to describe the gesture. Still, only slides between activation areas are used. All possible slides using two slides ("Two Slide Gestures") using four activation areas are shown in FIG. 5. There are 36 possible Two Slide Gestures using four activation areas. The generic formula for calculating the number of N-Slide Gestures for M activation areas is $M*(M-1)^N$.

FIG. 6 illustrates the use case of launching an application using a Two Slide Gesture. In FIG. 6*a* the graphical representations of the activation areas prompt the user to touch one activation area. FIG. 6*b* illustrate that when one of them is touched there is a visual prompt to slide the finger to another activation area. FIG. 6*c* illustrate that the gesture must be continued by sliding the finger to another activation area. FIG. 6*d* illustrate having reached the destination activation area and visual feedback is given informing the user that by releasing the finger, the application will be launched [or system function invoked]. And finally in FIG. 6*e*, the finger is released and visual feedback is given in the form of the launching application [or equivalent]. This technique for identifying gestures is very robust from a system perspective and from an end user's perspective there are obvious gains in form of muscle memory utilization and implicit tactile feedback.

Yet another important aspect of the invention remains though, which will become clear when observing FIG. 7. In FIG. 7a, the device's screen- and key lock is activated, meaning that the screen is turned off or in power save mode. However, the touch sensors are still active and looking for finger touches. In FIG. 7b, a finger in an activation area has been detected, but no visual or other feedback is given to the user. In FIG. 7c the finger has entered another activation area and still no feedback is given to the user. Not until in FIG. 7d does something happen, and that is unlocking the screen- and key lock as well as launching an application as the result of the Single Slide Gesture from activation area C to D. Note that this is the exact same gesture as in the first example illustrated in FIG. 4, and repeated here it gives the exact same result.

Note how the combination of the touch screen unlock mechanism and application launch system has reduced the number of actions on the end user's part substantially. The time required for accessing applications and system functions can thus be drastically lowered, increasing the ease-of-use for the end user.

Figure 8C:
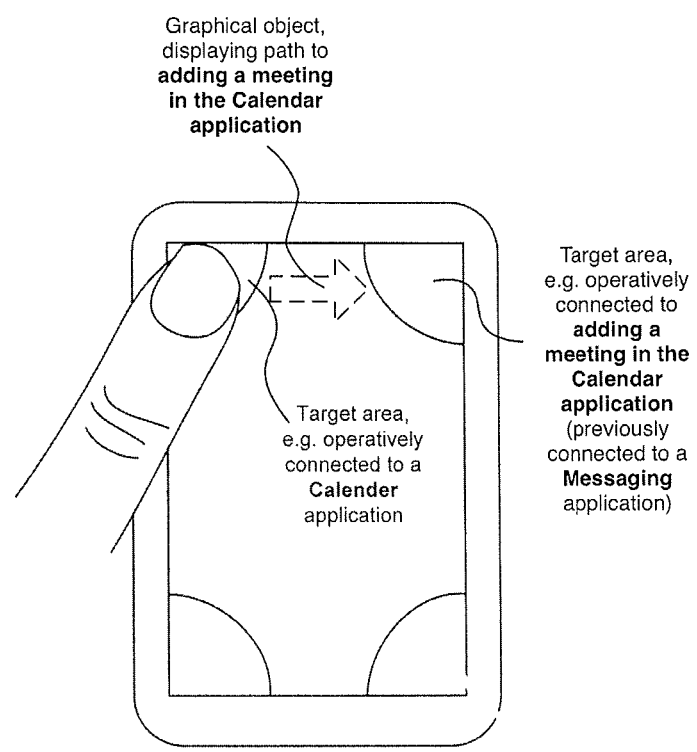
Figure 8D:
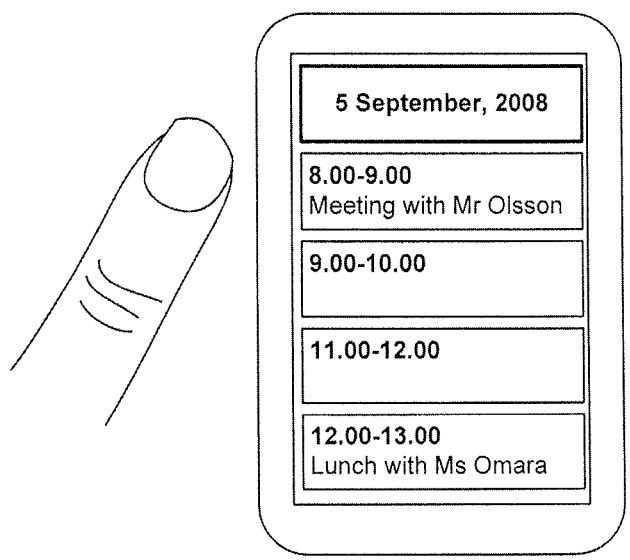

In FIG. 8, a concrete use case is shown. In FIG. 8a, the user touches an area that brings up three sub-choices; Launch Calendar, launch Messaging and launch Contacts. Graphical objects (arrows) are shown to indicate where to slide fingers in order to make a choice. In FIG. 8b, the user slides his finger through the intermediary area and the graphical indicator objects are updated to reflect in which directions the various choices are. In FIG. 8c, the finger has reached the target area and two things happen: 1) Another area is activated as a sub-choice (or sub-menu if you will) and 2) the current area is made to trigger on releasing the user's finger. In FIG. 8d, the user releases his finger instead of sliding to the next area and thus the calendar application (the first choice) is launched. This example demonstrated that Single- and Multi Slide Gestures are allowed to share a common start. The activation does not occur until the finger is released.

The invention claimed is:

1. A method in an electronic device having a processor and touch screen displaying a lock screen, the method comprising:
    receiving a start area user input actuation from a start area of a screen;
    displaying plural target areas of said screen, wherein each target area is operatively connected to an application launchable in said electronic device;
    receiving at least one intermediate area user input actuation from an intermediate area of said screen, said intermediate area being placed between said start area and a target area of said target areas of said screen;
    receiving a target area user input actuation from said target area of said screen;
    wherein the target area user input actuation includes at least one slide gesture in a vertical, a horizontal, or a diagonal direction;
    if said target area is associated with at least one sub-choice representing a specific action or operation within the application operatively connected to said target area:
    introducing a new start area coinciding with said target area; and
    for each associated sub-choice, introducing a new sub-choice target area associated with said sub-choice, each sub-choice target area coinciding with one of said target areas of said screen and each sub-choice target area being operatively connected to a specific action or operation within the application operatively connected to said target area; and
    if a sub-choice target area user input actuation is received from a sub-choice target area of said screen, unlocking said screen, launching said application operatively connected to said target area, and initiating, within said launched application, said specific action or operation within the application operatively connected to said sub-choice target area; and
    if said user input actuation is discontinued, unlocking said screen and launching said application operatively connected to said target area.

2. The method according to claim 1, further comprising switching screen mode from idle screen mode to active screen mode.

3. The method according to claim 2, wherein said idle screen mode is an energy saving screen mode in comparison with said active screen mode.

4. The method according to claim 1, further comprising in association with receiving said start area user input actuation from said start area of said screen, displaying at least one graphical object on said screen, each said graphical object indicating a placement of one of said target areas on said screen.

5. The method according to claim 4, further comprising determining a most recent user input actuation of said intermediate user input actuations, determining a most recent position based on said most recent user input actuation, and wherein said displaying a graphical object on said screen is made with respect to said most recent position.

6. The method according to claim 1, wherein said start area is a physically distinguishable area of said screen.

7. The method according to claim 6, wherein said start area is a corner of said screen.

8. The method according to claim 1, wherein said target area is a physically distinguishable area of said screen.

9. The method according to claim 8, wherein said target area is a corner of said screen.

10. The method according to claim 1, wherein said application is any of a calendar application software, a messaging application software, a web browser application software, a contacts list application software, game application software, setting management application software, music player application software, a camera application software, communications settings application software, or a video recording application software.

11. An apparatus comprising:
    a processing device;
    a memory operatively connected to said processing device; and
    a touch screen;
    said screen being adapted to display graphical information; and
    said screen being adapted to provide said processing device with information pertaining to a user input actuation input via said screen, said information being associated with a position of said touch actuation on screen and an input time;
    said processing device being adapted to:
    receive a start area user input actuation from a start area of a screen;
    display plural target areas of said screen, wherein each target area is operatively connected to an application launchable in said apparatus;
    receive at least one intermediate area user input actuation from an intermediate area of said screen, said intermediate area being placed between said start area and a target area of said target areas of said screen and includes at least one slide gesture in a vertical, a horizontal, or a diagonal direction;

receive a target area user input actuation from said target area of said screen;

if said target area is associated with at least one sub-choice representing a specific action or operation within said application operatively connected to said target area, introduce a new start area coinciding with said target area; and for each associated sub-choice, introduce a new sub-choice target area associated with said sub-choice, each sub-choice target area coinciding with one of said target areas of said screen and each sub-choice target area being operatively connected to a specific action or operation within the application operatively connected to said target area;

if a sub-choice target area user input actuation is received from a sub-choice target area of said screen, unlock said screen, launch said application operatively connected to said target area, and initiate, within said application, said specific action or operation operatively connected to said sub-choice target area; and if said user input actuation is discontinued, unlock said screen and launch said application operatively connected to said target area.

12. The apparatus according to claim 11, wherein said apparatus is a mobile communications terminal.

13. The apparatus according to claim 11, wherein said screen is a capacitive touch screen.

14. The apparatus according to claim 11, wherein said screen is a resistive touch screen.

15. A computer program product comprising computer program code stored on a non-transitory computer readable medium which, when executed on a processor of an electronic device having a touch screen displaying a lock screen, carries out the method of:

receiving a start area user input actuation from a start area of a screen;

displaying plural target areas of said screen, wherein each target area is operatively connected to an application launchable in said electronic device;

receiving at least one intermediate area user input actuation from an intermediate area of said screen, said intermediate area being placed between said start area and a target area of said target areas of said screen;

receiving a target area user input actuation from said target area of said screen;

wherein the target area user input actuation includes at least one slide gesture in a vertical, a horizontal, or a diagonal direction;

if said target area is associated with at least one sub-choice representing a specific action or operation within the application operatively connected to said target area, introducing a new start area coinciding with said target area; and for each associated sub-choice, introducing a new sub-choice target area associated with said sub-choice, each sub-choice target area coinciding with one of said target areas of said screen and each sub-choice target area being operatively connected to a specific action or operation within the application operatively connected to said target area; and if a sub-choice target area user input actuation is received from a sub-choice target area of said screen, unlocking said screen, launching said application operatively connected to said target area, and initiating, within said launched application, said specific action or operation operatively connected to said sub-choice target area; and if said user input actuation is discontinued, unlocking said screen and launching said application operatively connected to said target area.

\* \* \* \* \*